(12) United States Patent
Lau (10) Patent No.: US 7,400,416 B2
(45) Date of Patent: Jul. 15, 2008

(54) ACCURATE TARGET ORIENTATION MEASURING SYSTEM

(75) Inventor: Kam C. Lau, Potomac, MD (US)

(73) Assignee: Automated Precision, Inc., Rockville, MD (US)

( * ) Notice: Subject to any disclaimer, the term of this patent is extended or adjusted under 35 U.S.C. 154(b) by 213 days.

(21) Appl. No.: 11/326,287

(22) Filed: Jan. 6, 2006

(65) Prior Publication Data

US 2006/0192090 A1    Aug. 31, 2006

Related U.S. Application Data

(60) Provisional application No. 60/641,739, filed on Jan. 7, 2005.

(51) Int. Cl.
*G01B 11/14* (2006.01)

(52) U.S. Cl. ...................... 356/614; 356/623

(58) Field of Classification Search .............. 356/3–22
See application file for complete search history.

(56) References Cited

U.S. PATENT DOCUMENTS

| 4,060,809 A | 11/1977 | Baghdady |
| 4,714,339 A | 12/1987 | Lau et al. |
| 5,212,738 A | 5/1993 | Chande et al. |
| 5,229,828 A | 7/1993 | Wiklund |
| 5,974,348 A | 10/1999 | Rocks |
| 5,979,070 A | 11/1999 | Lau |
| 6,049,377 A | 4/2000 | Lau et al. |
| 6,269,284 B1 | 7/2001 | Lau et al. |
| 6,392,222 B1 | 5/2002 | Greenwood |
| 6,667,798 B1 | 12/2003 | Markendorf et al. |

OTHER PUBLICATIONS

PCT International Search Report PCT/US03/26493, Automated Precision, Inc.

*Primary Examiner*—Michael P Stafira
(74) *Attorney, Agent, or Firm*—Pillsbury Winthrop Shaw Pittman, LLP (57) ABSTRACT

A system for accurate determination of target orientation in a laser tracking system. A target aperture is configured to produce spatially distinct laser beam and background images. A processing unit is configured to determine a centroid of the laser beam image position using information collected from detected images, such as laser beam and background images. The laser beam image centroid position is used to determine an accurate target orientation. In one example, a process for determining target orientation includes the steps of collecting a background image passing through a first retro-reflector at a first laser light sensor; 2) collecting a measurement image passing through a second retro-reflector at a second laser light sensor; 3) establishing a common positional reference point for the measurement image and the background image; 4) subtracting the background image from the measurement image based on the common positional reference point.

19 Claims, 10 Drawing Sheets

ACCURATE TARGET ORIENTATION MEASURING SYSTEM

The present application claims priority to U.S. Provisional Application No. 60/641,739 entitled Accurate Target Orientation Measuring System, filed Jan. 7, 2005.

BACKGROUND

1. Field of the Invention

The present invention relates generally to a measuring system. In particular, the systems and methods of this invention are directed toward a multi-dimensional laser tracking system for measuring target orientation.

2. Background of the Invention

Precision measuring systems have a wide variety of applications. For example, in robotics, accurate positioning and orientation of a robot is often required. To achieve a high degree of precision, a robot position measuring system can be used. Such a system typically uses a laser beam interferometer to determine the position and/or orientation of an end-effector of the robot. Such system can monitor the position and orientation of the robot end-effector in real-time while providing accuracy, speed and measurement data.

For example, a Three and Five Axis Laser Tracking System is discussed in Applicant's U.S. Pat. No. 4,714,339, and a Five-Axis/Six-Axis Laser Measuring System is discussed in Applicant's U.S. Pat. No. 6,049,377, both of which are incorporated herein by reference in their entirety. In addition, Applicant's U.S. application Ser. No. 60/377,596, entitled "Nine Dimensional Laser Tracking System and Method," which was filed on May 6, 2003, is also incorporated herein by reference in its entirety to provide additional description for the present invention. In addition, Applicant's U.S. application Ser. No. 10/646,745 (hereinafter "'745" application) describes a multi-dimensional measuring system, whose contents are incorporated herein by reference in their entirety.

BRIEF SUMMARY OF THE INVENTION

One aspect of the invention provides an accurate target orientation measurement system as part of a multi-dimensional measuring system. In one aspect, the multi-dimensional measurement system includes a tracking unit, a target, a distance determining module, and an output module as described in detail in the '745 application. Preferably, the target orientation measurement system includes a laser tracking unit, a target and an artificial intelligence unit. A laser beam sent by the tracking unit and incident on the target is used to determine target orientation. By detection of a position of the centroid of the incident laser beam on a detector (also termed "laser light sensor" or "sensor" hereinafter) in the target, the relative orientation of the target can be determined precisely.

In one aspect of the invention, the target includes at least one retro-reflector. The at least one retro-reflector has an apex. The apex is configured to allow at least part of a laser beam light entering the retro-reflector to exit the retro-reflector. The target further includes a laser light sensor configured to detect the at least part of the laser beam light exiting the retro-reflector through the apex. The target further includes a filter positioned between the retro-reflector and the laser light sensor. In one aspect, the retro-reflector is a solid retro-reflector. The apex of the solid retro-reflector includes a small flat polished surface that acts as an aperture to allow the at least part of the laser beam light to exit the retro-reflector.

The at least one retro-reflector can alternatively be a hollow retro-reflector, that includes an opening at the apex. The aperture is configured to allow the at least part of the laser beam light to exit the retro-reflector. Preferably, the hollow retro-reflector includes three mirrors that form the apex. Preferably, the three mirrors form respective parts of three mutually orthogonal surfaces of a cube, which surfaces meet at the apex.

In one aspect, the size of the aperture is designed to prevent background light received from large angles from overlapping with the image of the laser beam on the laser light sensor.

Preferably, the optical filter preferentially filters background light and reduces image intensity of background light on the laser light sensor.

The laser light sensor can be an analog position sensitive photodetector. Alternatively, the laser light sensor can be a charge coupled device array sensor or CMOS array sensor.

Preferably, the laser light sensor is coupled to the artificial intelligence (AI) unit configured to calculate the laser centroid position. In one aspect, the AI unit executes a special algorithm for laser centroid computation and pattern recognition of the retro-reflector aperture pattern Another aspect of the invention provides a target containing two retro-reflectors. A measurement retro-reflector is configured to receive a laser beam and pass at least part of the laser beam through an aperture to a first laser light sensor. A reference retro-reflector is configured to receive background light radiation and pass at least a portion of the background light radiation through an aperture to a second laser light sensor. In one embodiment, the first and second laser light sensor form portions of a common sensor. A processing unit in communication with the first and second laser light sensors is configured to receive a beam measurement image formed in the first laser light sensor and a background image formed in the second laser light sensor. A corrected laser beam image can be obtained by referencing each image with respect to a reference point and subtracting the background image from the beam measurement image, in order to provide a more accurate image for centroid calculation.

Another aspect of the invention provides a method for accurately measuring a target orientation. Exemplary steps of the method include: 1) forming a background image at a laser light sensor position predetermined to be spatially separate from a laser beam image; 2) collecting a laser beam image of a laser beam passing through a target aperture and impinging on the laser light sensor; 3) determining a centroid of the laser beam image; and 4) determining the target orientation from the centroid position.

A further aspect of the invention provides a method for increasing the accuracy of determining the position of a laser beam image. Exemplary steps of the method include: 1) collecting a background image passing through a first retro-reflector at a first laser light sensor; 2) collecting a measurement image passing through a second retro-reflector at a second laser light sensor 3) establishing a common positional reference point for the measurement image and the background image; and 4) subtracting the background image from the measurement image based on the common positional reference point.

DETAILED DESCRIPTION OF THE INVENTION

The systems and methods of this invention employ a combination of a tracking unit, a target, and a process unit to accomplish accurate target orientation determination.

Additionally, the systems and methods of this invention, using a 6-D tracking system, lend themselves to use in the robotic arts. For example, the 6-D laser tracking system can be incorporated into a robot, that is, for example, capable of scaling various objects such that, for example, precise measurements can be taken of those objects and/or various functions performed at specific locations on the object.

Figure 1:
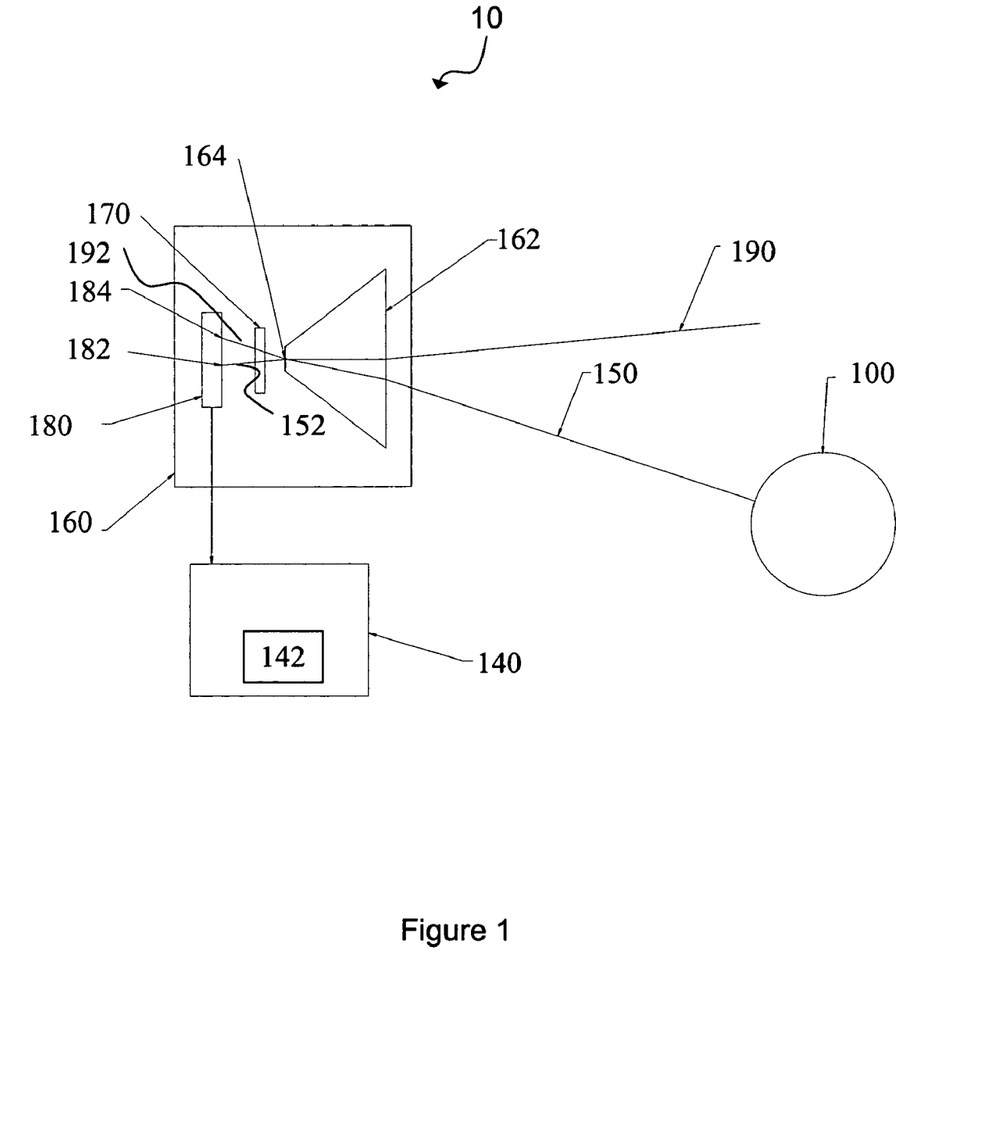
FIG. 1 is a schematic diagram illustrating an exemplary accurate target orientation measuring system of the invention.

FIG. 1 is a schematic diagram illustrating an exemplary accurate target orientation determination system 10, according to one embodiment of the present invention. Tracking unit 100 is configured to produce a laser beam 150 incident on target 160. Laser beam 150 can pass into retro-reflector 162, where at least a part of laser beam 150 can pass through aperture 164 where it can propagate as transmitted beam 152 until reaching laser light sensor 180, where a laser beam image is formed. The shape and position of laser beam image 182 is used to determine the orientation of target 160. Also provided in target 160 is a filter 170 that can filter background light 190 incident on retro-reflector 162. For example, background light 190 can be at least partially transmitted through aperture 164 and filter 170 as light 192 and be received at laser light sensor 180 as image 184. By appropriate use of filter 170, the amount or intensity of image 184 can be reduced.

Laser light sensor 180 preferably is configured as a planar detector. Preferably laser light sensor 180 contains a charge coupled device or a CMOS-type camera of known design, both of which are configured to produce a 2-dimensional image based on light intensity incident as a function of position on the laser light sensor. Alternatively, laser light sensor 180 includes an analog position sensitive detector of know design.

Laser light sensor 180 is coupled to a processing unit, for example, Artificial Intelligence (AI) unit 140. AI unit 140 can be a computer, microprocessor, program, or other combination of hardware and software capable of processing information received from laser light sensor 180. AI unit 140 can be configured to receive and store a background pattern, for example pattern 184, as well as a laser beam pattern, for example 182. In another aspect, AI unit is configured to perform various operations. For example, background pattern 184 can be subtracted from laser beam pattern 182, as discussed further below. In another aspect, AI unit 140 contains image processing algorithm 142. Algorithm 142 can be embodied in software or hardware included in AI unit 142. Preferably algorithm 142 is designed to calculate a centroid position of a laser beam pattern, such as pattern 182, as well as perform operations such as an aperture pattern recognition routine.

Figure 1A:
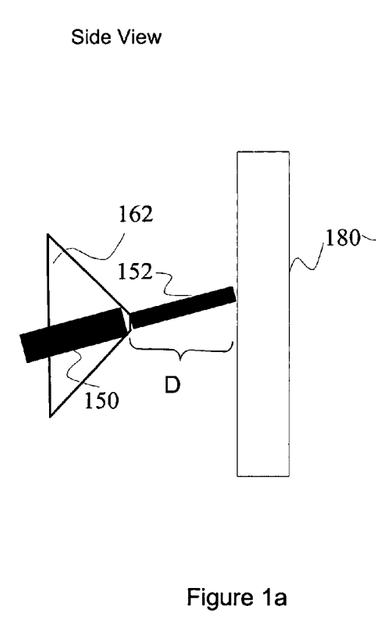
FIGS. 1a and 1b depict a side view and front view, respectively, of laser beam image formation on a laser light sensor.

When incident laser beam 150 passes through aperture 164, transmitted laser beam 152 strikes laser light sensor 180, forming image 182, as illustrated further in FIG. 1a. Retro-reflector 162 and laser light sensor 180 are configured to measure the pitch and yaw orientations or movements of target 160. Vectors $V_y$ plus $V_x$ and distance D give angle position of incoming laser beam 150 with respect to target 160. For example, if target 160 is oriented in a reference orientation with respect to laser beam 150, transmitted beam 152 may strike laser light sensor 180 at origin position 186. However, as indicated by position of image 182, any yaw movement (x direction) or pitch movement (y direction) shifts of target 160 causes a concomitant shift in retro-reflector 162 and a movement in the position of the beam image away from origin position 186. By calculating the magnitude of vectors Vx and Vy, the change in angular orientation of target 160 with respect to the laser beam 150 can be determined.

Figure 1B:
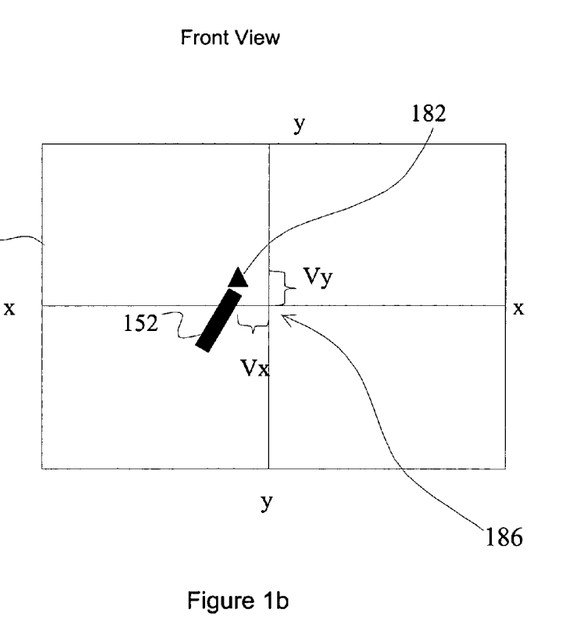

In an exemplary embodiment, retro-reflector 162 is a solid body of about 10 mm dimension. Preferably, the diameter of laser beam 150 is about 3 mm to 8 mm. Preferably, the size of aperture 164 is about 0.05 mm to about 0.8 mm. Thus, when beam 150 enters retro-reflector 162, only a portion of beam 150 passes through aperture 164 as transmitted beam 152. Accordingly, laser beam image 182 can appear similar in shape to aperture 164. For example, in one embodiment, aperture 164 is triangular in shape, resulting in a triangular shape for beam image 182, as illustrated in FIG. 1b.

With the use of system 10 of FIG. 1, accurate determination of target orientation entails, among other things, accurate determination of a position of laser beam image 182 on laser light sensor 180. Preferably, the position of a centroid of the laser beam image is used to determine the target orientation. Because laser beam tracking typically occurs under conditions where other sources of light (background light) impinge on the target, the background sources of light can interfere with proper determination of a laser beam image position on a laser light sensor. In addition, optical effects intrinsic to the laser source, such as diffraction, can contribute to uncertainty in determining laser beam image position.

Figure 2:
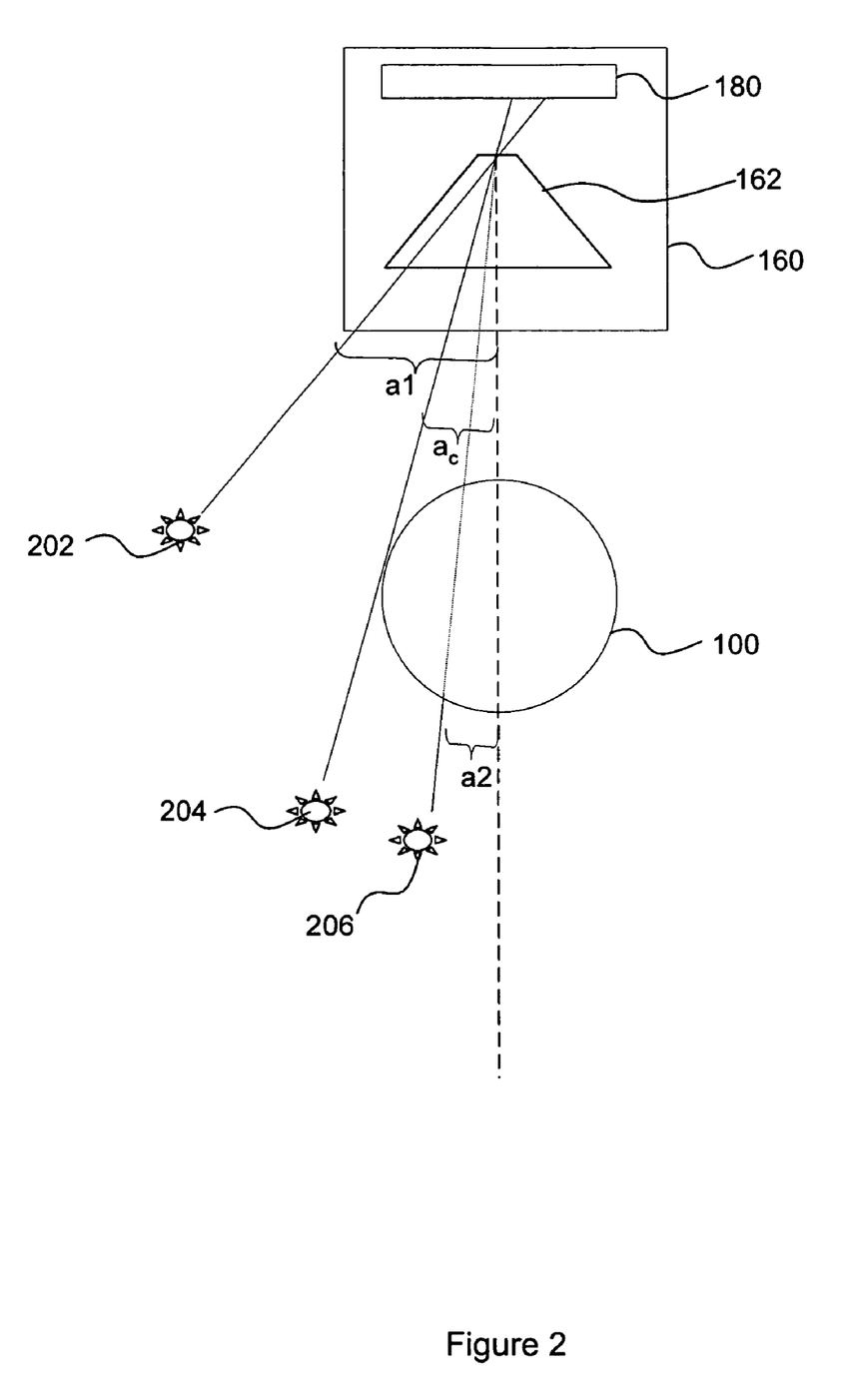
FIG. 2 illustrates screening of low angle radiation by a laser source.

Background light entering into target 160 can be reduced by configuration of tracking unit 100. For example, as illustrated in FIG. 2, when a laser source such as laser tracking unit 100 is positioned close to target 160, the source acts to block background light incident at angles close to the angle of incidence of the laser on target from entering the target. For example, a tracking unit operating at a distance of 1-2 meters may block out background radiation whose divergence angle is within about a degree or so of the incident laser. As used herein, the term divergence angle refers to the angle between the direction of a laser beam incident on a target and the angle of background light incident on the same target.

The direction of the laser beam itself can form any angle with respect to the target. Above a critical divergence angle $a_c$, greater than about 1 to several degrees for the above case, depending on several factors, background light is not screened out by the tracking unit that emits the laser, and can impinge on the target. Thus, background light sources 202 and 204, positioned at an angle a1 (>$a_c$) and $a_c$, respectively, are able to enter retro-reflector 162 and form images on laser light sensor 180.

Below the critical divergence angle, the tracking unit acts to block background light from entering the target. Thus, light from source 206, positioned at an angle a2<$a_c$, is blocked from entering retro-reflector 162. Factors that influence the critical divergence angle include the size of tracking unit 100, as well as the distance between tracking unit 100 and target 160.

As the laser source (tracking unit) is moved further from the target, the critical divergence angle is reduced, and background radiation at smaller divergence angles can enter the target. However, the intensity of the background radiation originating from longer distances is much lower, since the intensity of point source radiation scales as $1/d^2$ where d is the distance from background radiation source to target. Thus, the potential effect of low angle background radiation is reduced at large distances. Therefore, background radiation sources present at angles above the critical divergence angle are mostly a concern for operation of a tracking unit at close distances to a target, where the intensity of light entering the target can be significant.

Figure 3A:
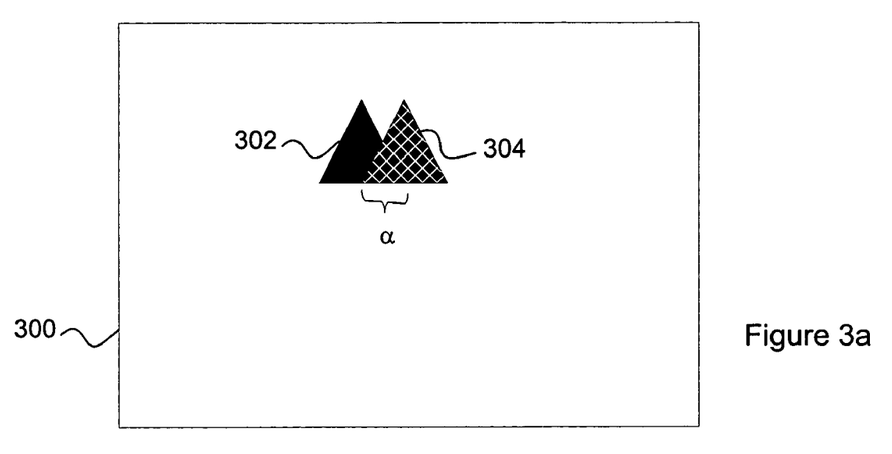
FIG. 3a illustrates image formation on a laser light sensor using a relatively larger retro-reflector aperture.
Figure 3B:
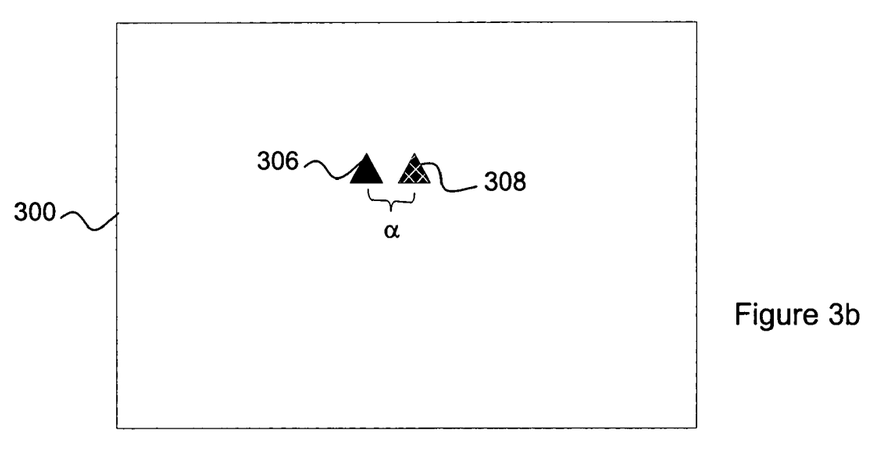
FIG. 3b illustrates image formation on a laser light sensor using a relatively smaller retro-reflector aperture.

As discussed above, especially for close distances between source and target, large angle background radiation, that is, radiation incident at angles with a divergence angle larger than the critical divergence angle, can potentially enter a retro-reflector and interfere with a laser beam image formed at a laser light sensor. In another embodiment of the present invention, an aperture of a retro-reflector is configured to minimize the effect of background light in determining a position of the laser beam image on a laser light sensor. Preferably, a laser beam diameter incident on a retro-reflector is about 3-8 mm. Preferably, an aperture size is about 0.05 to about 0.2 mm. An exact size of the aperture can be varied based on a target to laser source separation used for laser tracking. The size of the aperture can be designed, for example, such that the viewing angle of the camera is smaller than one degree. In one embodiment of the present invention, by decreasing the aperture size to 0.1 mm, an image position on a laser light sensor for images formed from large angle background radiation is separated from the laser beam image, rendering the laser beam image relatively unperturbed by the background radiation, as illustrated in FIGS. 3*a* and 3*b*. FIG. 3*a* illustrates the image formation on a laser light sensor 300 using a relatively larger aperture size, for example, a 0.6 mm triangular aperture. Laser beam image 302 is seen to overlap with background image 304. Laser beam image 302 and background image 304 are formed when background radiation incident at an angle of α with respect to an incident laser beam pass thru a triangular aperture and impact laser light sensor 300. For example, α can equal about three degrees. In FIG. 3*b*, in which a relatively smaller aperture is used, for example, a 0.1 mm aperture, laser beam image 306 and background image 308, formed from a laser beam and background radiation, respectively, separated by the same angle α, are well separated and do not overlap. Accordingly, a centroid of image 306 can be more easily determined, rendering the calculation of target orientation more precise.

In accordance with the above results, a critical divergence angle can be used to tailor an appropriate aperture size. For example, at close separation of target and tracking unit where nearby background light intensity is sufficient to interfere with a laser beam image, a critical divergence angle $a_c$ might be determined to be two degrees, above which angle the tracking unit does not screen incident background light. An aperture size can be accordingly chosen to assure that the laser beam image formed on the laser light sensor subtends an angle smaller than $a_c$, so that the background and laser beam images do not overlap. As noted above, small angle background radiation in some cases is not of significant intensity. If some small angle background light does enter the retro-reflector and its image overlaps with the laser beam image on the sensor, a centroid computation error caused by the background light may be negligible, since the laser intensity may be about two orders of magnitude higher than the background light and the centroid separation of the two images is small.

In an exemplary embodiment, a CMOS or CCD camera with a pixel size of about 5 to 10 microns and a detector size of about 0.5"×0.4" is used as a laser light sensor. Accordingly, for an aperture size of about 100 microns (0.1 mm) that forms a laser beam image of similar dimensions on a laser light sensor placed in close proximity, the image formed corresponds to about one hundred to several hundred imaging pixels.

Preferably, the laser light sensor of FIG. 1, can output a detected image and be refreshed at a rate of about 15 to 20 times per second. Accordingly, an accurate orientation of target 160 can be determined at least 15 times per second.

Referring again to FIG. 1, in an exemplary embodiment, filter 170 includes a band pass filter that can preferentially filter out background radiation that does pass through aperture 164, so that any effect of background radiation on detected laser beam image 182 can be further reduced.

Exemplary Experimental Results

Figure 4:
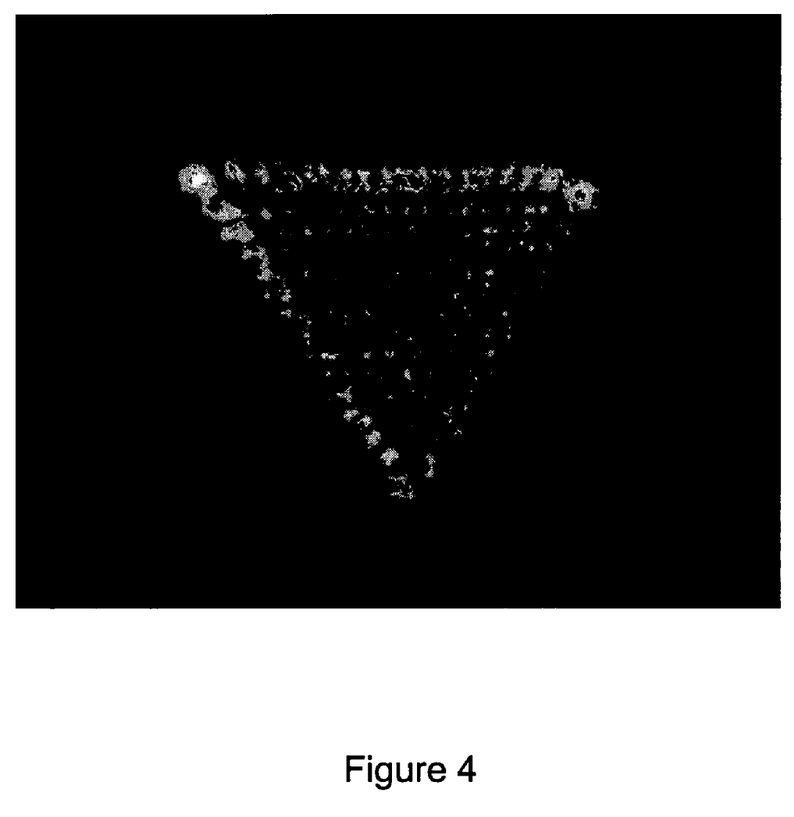
FIG. 4 illustrates a laser beam image taken using a relatively larger triangular aperture.

The following discussion sets forth results of measurements performed according to methods and systems of the present invention. Experimental data was measured and collected by a target orientation system having a solid retro-reflector in the shape of a cube corner region. An apex at a cube corner contains an aperture in the shape of a triangle or other shape through which laser beam light can pass to a laser beam sensor. FIG. 4 illustrates a laser beam image taken using a 0.6 mm triangular aperture. A diffraction pattern in observed, rendering the image less than ideal, for the purposes of calculating a centroid position. The diffraction effect occurs due to light waves whose wavelength corresponds to the laser radiation and therefore cannot be eliminated by means of filtering other background wavelengths.

Figure 5:
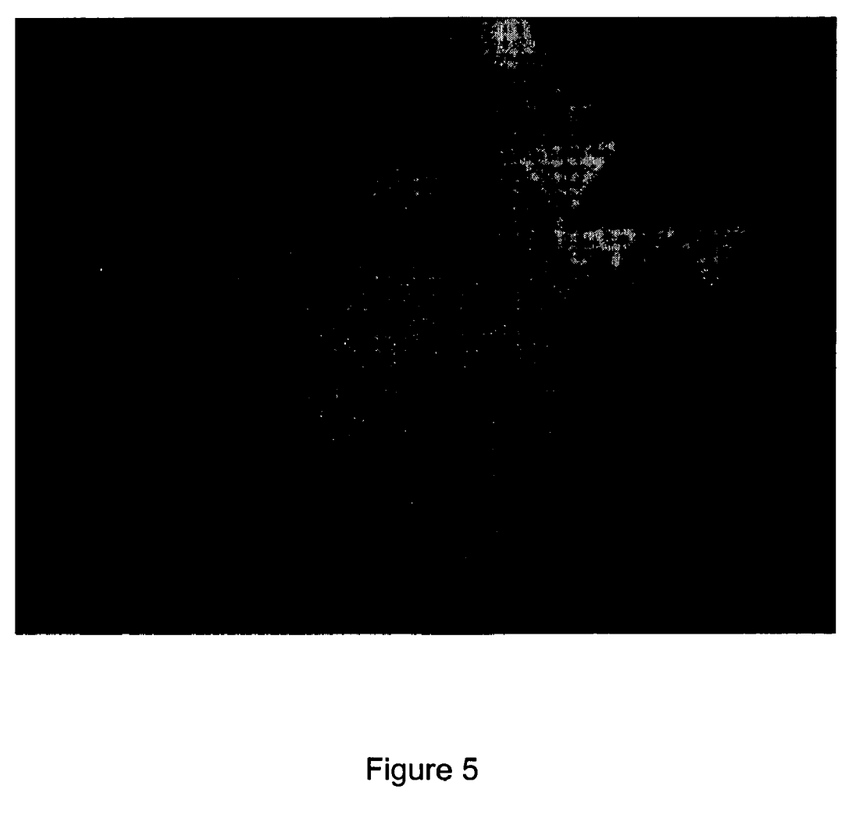
FIG. 5 illustrates background radiation images obtained by passing background light through a large aperture without the presence of laser beam.

FIG. 5 illustrates background radiation images obtained by passing background light through a large aperture without the presence of laser beam radiation. Several aperture images are apparent, without a clear image center, suggesting that several dispersed sources of background light are present. The images observed in FIG. 5 can result from background radiation received through a large aperture at angles sufficiently large to avoid being blocked by the laser tracking unit, such as unit 100 shown in FIG. 1. By use of filtering techniques, or reduction in aperture size, such background features can be reduced in intensity or separated from a laser beam image that is concurrently received at a laser light sensor.

Figure 6:
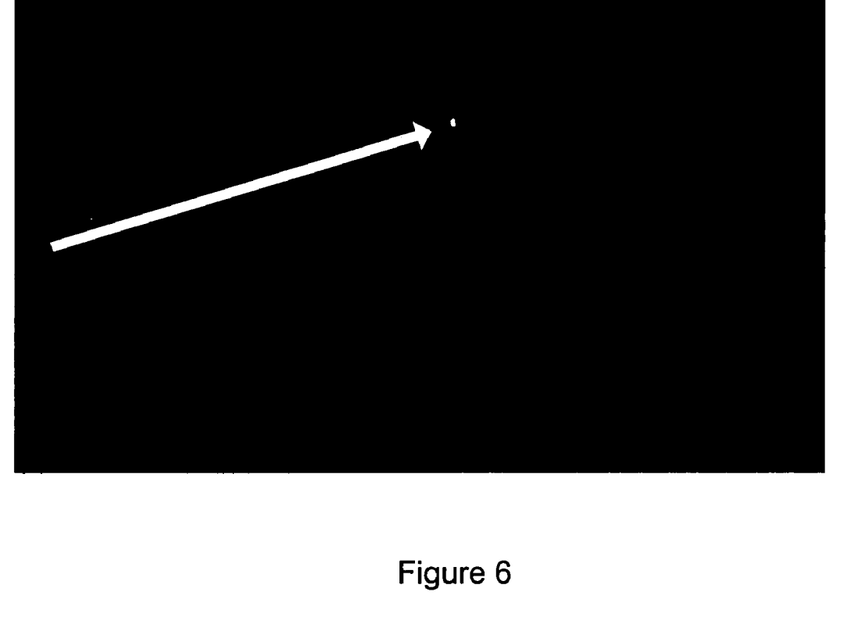
FIG. 6 illustrates a laser beam image of a laser beam partially transmitted through a small aperture.

FIG. 6 illustrates a laser beam image of a laser beam partially transmitted through a small aperture. In this case, only a small, clearly defined spot is observed. As noted above, small angle background radiation can be effectively blocked by the laser tracking unit itself, while large angle background radiation transmitted through the small aperture will form an image distinctly separate from the laser beam image. In this case, the intensity of any wide angle background radiation is not sufficient to form a clear image. Accordingly, a centroid position of the laser beam can easily be determined.

Figure 7:
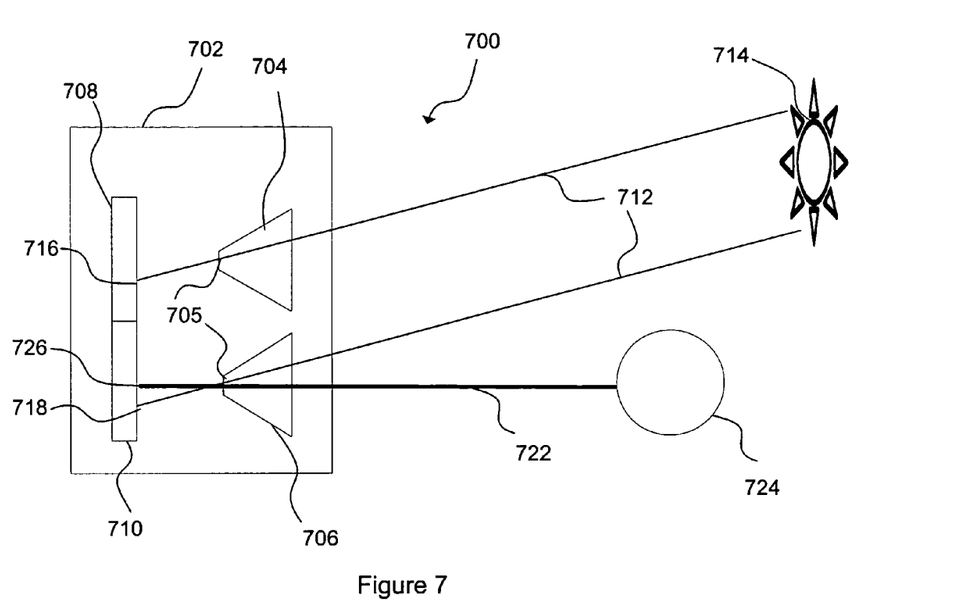
FIG. 7 illustrates a dual retro-reflector target system, arranged according to another embodiment of the present invention.

FIG. 7 illustrates a dual retro-reflector target system 700, arranged according to another embodiment of the present invention. Target 702 includes reference retro-reflector 704 and measurement retro-reflector 706. Preferably, measurement and reference retro-reflectors 704, 706 are configured in a similar manner. For example, each can include substantially similar apertures 705. Both retro-reflectors can be arranged with the same orientation with respect to target 702. Preferably, retro-reflectors are identical in size, orientation, and other physical properties. Laser light sensors 708 and 710 collect light passing through retro-reflectors 704 and 706, respectively. The sensors can be arranged as separate laser light sensors or as portions of a single detector. However, preferably, both sensors are constructed in substantially similar fashion. For example, both sensors can be CMOS sensors configured with the same pixel size and overall pixel array size. Background radiation, for example, radiation 712 received from radiation source 714 is collected on sensors 708 and 710 as background images 716 and 718, respectively. Preferably, sensors 708 and 710 are identical. Tracking unit 724 emits laser beam 722, which is also received at laser light sensor 710, forming image 726. Preferably, in operation, the roles of retro-reflectors 704 and 706, as well as sensors 708 and 710, can be reversed. In other words, retro-reflector 704 can act as a measurement retro-reflector and receive a laser beam and background radiation together, when retro-reflector 706 acts as a reference retro-reflector, receiving only background light.

Figure 7A:
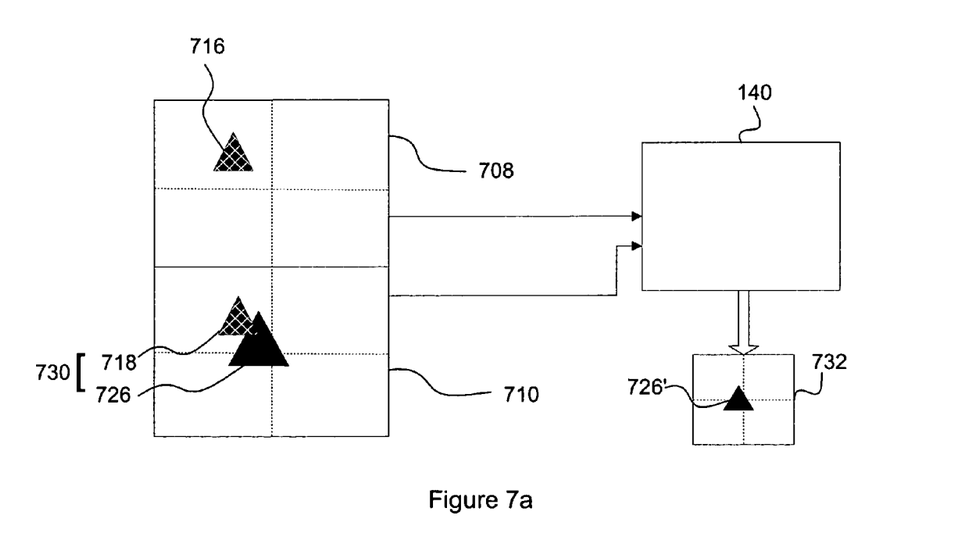
FIG. 7a illustrates details of image formation for images formed in accordance with the system of FIG. 7.

FIG. 7a illustrates details of image formation for images 716, 718 and 726. Background images 716 and 718 are registered in the same relative position with respect to a reference point for each of laser light sensors 708 and 710, respectively. Laser beam image 726 can overlap background image 718, forming a common measurement image 730. Sensors 708 and 710 are coupled to AI unit 140, so that images 716 and 730 can be output, stored, and manipulated therein. For example, based the assumption that reference images 716 and 718 are substantially identical, AI unit 140 can perform a subtraction of image 716 from image 730 to produce a background subtracted extracted laser beam image 726' (also termed "corrected measurement image"), as illustrated. Extracted image 726', substantially the same as image 726, can be further manipulated to determine, for example, an image centroid.

Figure 8:
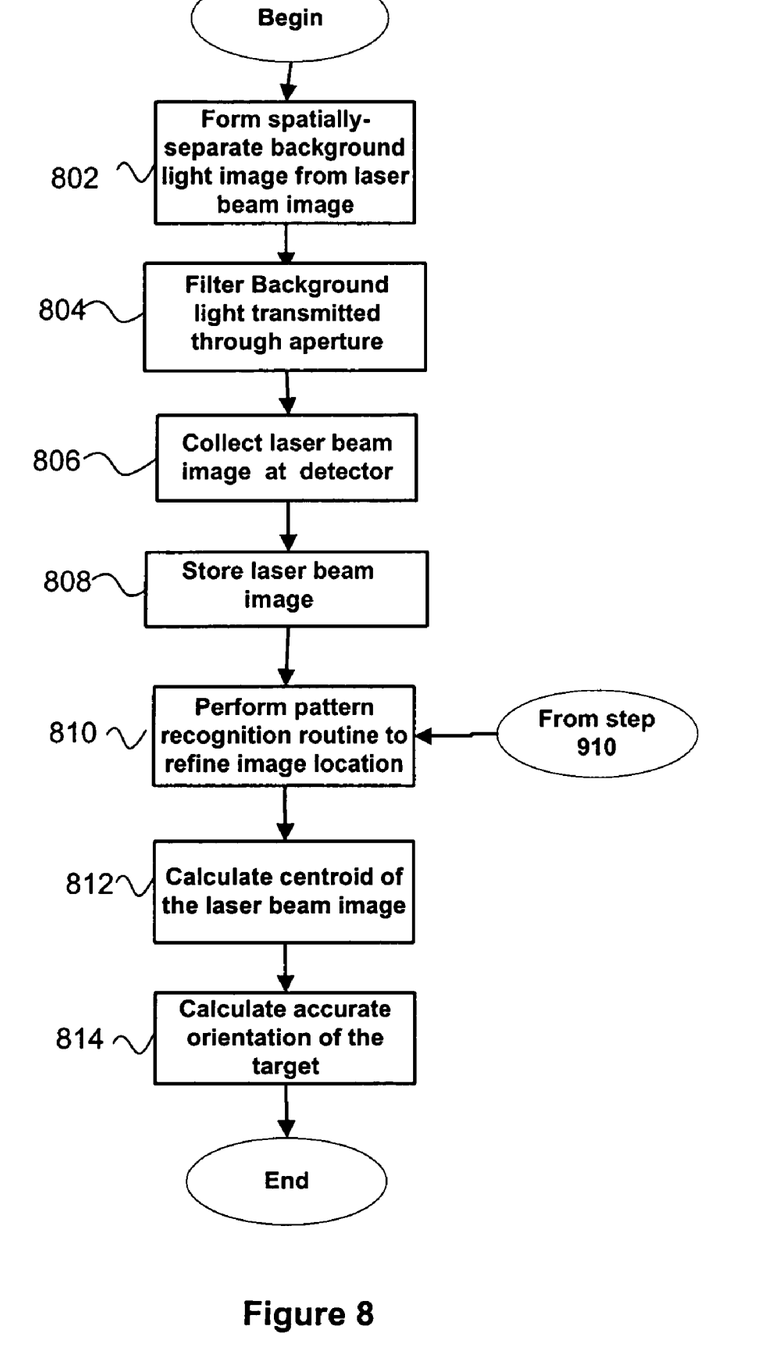
FIG. 8 illustrates exemplary steps involved in a method for improved target orientation measurement, according to one embodiment of the present invention.

FIG. 8 illustrates exemplary steps involved in a method for improved target orientation measurement, according to one embodiment of the present invention. In step 802, a high angle radiation image formed from background light sources is formed at a laser light sensor such that is spatially separated from a laser image. The laser image may be formed at any position on a laser light sensor. As, discussed above, the laser source, such as tracking unit 100 of FIG. 1, acts to screen out low angle radiation, that is, radiation forming an angle less than $a_c$, as discussed above. In one embodiment, an aperture size based on a predetermined $a_c$ is employed to provide for separation of high angle radiation images and laser beam images. Accordingly, any background images registered on the laser light sensor do not overlap with the laser beam image.

In step 804, background light entering through an aperture is preferentially filtered before impinging on a laser light sensor. For example, a band pass filter can be chosen to preferentially filter background light with respect to laser light of a predetermined wavelength.

In step 806, a laser beam image is collected on the laser light sensor. Preferably, the image comprises an image of an aperture significantly smaller than the diameter of the laser beam. Preferably, the laser light sensor is configured to collect and refresh images at a rate of 15 times per second or greater.

In step 808, information contained in the laser beam image is stored. For example, known programs can store an image as light intensity information as a function of pixel position in the laser light sensor.

In step 810, a pattern recognition routine is performed. For example, a stored laser beam image can be processed by a routine run by an AI unit to account for pattern effects generated by an aperture, such as those discussed above.

In step 812, a centroid of the laser beam image is calculated. For example, in the case of a triangular aperture, an algorithm can be run by an AI unit to determine a precise position of a centroid of the laser beam image. The algorithm can take into account aperture pattern effects, the exact geometry of the aperture, and the presence of background light images, among other factors.

In step 814, an accurate orientation of the target is determined based on the centroid position using the methods described above and in the '745 application.

Figure 9:
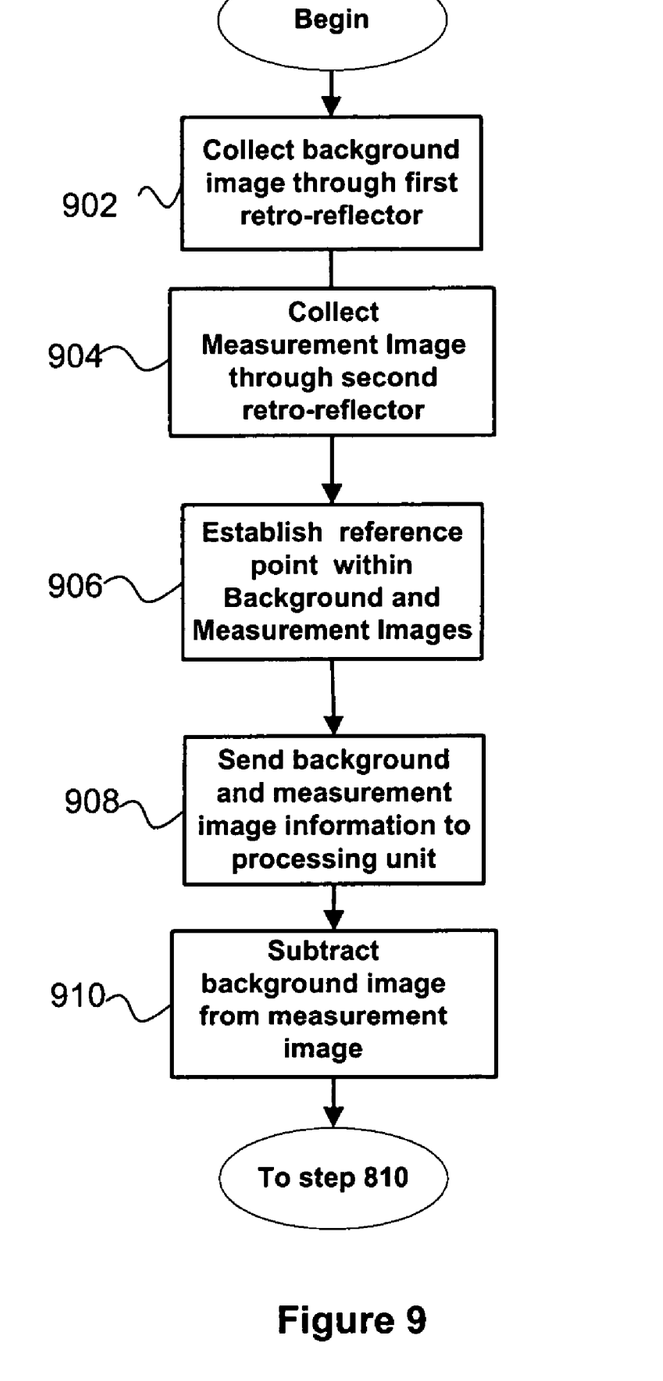
FIG. 9 illustrates exemplary steps involved in a method for accurately determining a laser beam image, according to another embodiment of the present invention.

FIG. 9 illustrates exemplary steps involved in a method for accurately determining a laser beam image, according to another embodiment of the present invention.

In step 902, a background image is collected. Preferably, the background image is collected from light passing through a first retro-reflector commonly housed in a target with a second retro-reflector. Preferably, the background image is collected in a reference detector configured to collect only background radiation.

In step 904, a measurement image is collected. Preferably, the measurement image is received through the second retro-reflector housed in common in a target containing a first retro-reflector. Preferably, the measurement image is collected in a detector configured to receive the same background image as the reference detector, as well as a laser beam image.

In step 906, one or more reference points are established within each the measurement image and background image. For example, a predetermined pixel position in each detector may serve as a reference point. The reference point can aid in manipulation of collected images.

In step 908, information from the background image and measurement image are sent to a processing unit. For example, the information may constitute a 2 dimensional map of radiation received in pixels of each of the reference and the measurement detectors. Preferably, the processing unit stores the maps as background and measurement image files (also termed "images") or any similar type of file.

In step 910, a background image is subtracted from a measurement image to produce a corrected laser beam (or "measurement") image. For example, based on reference points established for the background and measurement images, where the images may be stored as two dimensional maps of light intensity as a function of pixel position, relative pixel positions between each image can be correlated using the reference points to aid subtraction of one image from another. In one embodiment, after step 910, the process moves to step 810 where further processing steps can be carried out to enable a final determination of target orientation, as discussed above.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for accurate target orientation measurement, comprising:
    a target capable of pitch and yaw movements;
    a measurement retro-reflector disposed within the target for transmitting a received laser beam, the measurement retro-reflector having an aperture disposed therein for transmitting the laser beam;
    a reference retro-reflector disposed within the target for transmitting only background radiation, wherein the reference retro-reflector is substantially similar to the measurement retro-reflector and is located adjacent to the measurement retro-reflector;
    a laser light sensor that registers an image of the transmitted laser beam and the transmitted background radiation; and
    a processing unit that receives position information of the laser beam image and the background radiation image and determines pitch and yaw movement of the target based on the received position information, wherein a size of the aperture is smaller than a critical size above which the background radiation image interferes with the laser beam image, the background radiation image formed from the background light radiation.

2. The system of claim 1, wherein the laser light sensor comprises:
    a reference portion for detecting the background radiation transmitted by the reference retro-reflector; and
    a measurement portion for detecting the laser beam and the background radiation transmitted by the measurement retro-reflector, wherein the reference portion and the measurement portion are substantially similar.

3. The system of claim 2, wherein the laser light sensor includes a camera based on at least one of CMOS or CCD technology.

4. The system of claim 3, wherein the camera has dimensions of about 0.5 inches by 0.4 inches and a pixel size of about 10 microns or less.

5. The system of claim 1, wherein the measurement retro-reflector comprises a solid retro-reflector that includes a small flat polished surface that defines the aperture.

6. The system of claim 5, wherein the aperture has a size of about one millimeter or less.

7. The system of claim 1, further comprising a tracking unit that emits the laser beam to the target, wherein the tracking unit is positioned to screen out the background radiation incident toward the target within a critical angle of divergence from the laser beam.

8. The system of claim 1, further comprising a filter positioned between the laser light sensor and one or more of the measurement retro-reflector or the reference retro-reflector, wherein the filter preferentially filters the background radiation transmitted by one or more of the measurement retro-reflector or the reference retro-reflector and reduces an intensity of the background radiation image registered by the laser light sensor.

9. A method for accurate target orientation determination, comprising:
    collecting a background image from background radiation transmitted through a first retro-reflector disposed within the target;
    collecting a measurement image from a laser beam and the background radiation transmitted through a second retro-reflector disposed within the target;
    establishing a reference point within each of the background image and the measurement image; and
    subtracting the background image from the measurement image using the reference points established for each of the background image and the measurement image.

10. The method of claim 9, further comprising sending the background image and the measurement image to a processing unit, wherein the subtracting the background image from the measurement image produces a corrected measurement image.

11. The method of claim 10, further comprising determining an image centroid from the corrected measurement image.

12. The method of claim 11, further comprising performing a pattern recognition routine to refine a position of the corrected measurement image.

13. A method for accurate target orientation determination, comprising:
    collecting a background image at a position on a laser light sensor predetermined to be spatially separate from a laser beam image;
    collecting the laser beam image from a laser beam passing through an aperture disposed within a target and impinging on the laser light sensor;
    determining a centroid of the laser beam image; and
    determining an orientation of the target from a position of the centroid.

14. The method of claim 13, further comprising filtering background radiation transmitted through the aperture.

15. The method of claim 13, further comprising performing a pattern recognition routine to refine a position of the laser beam image.

16. The method of claim 13, further comprising selecting a size for the aperture size based on a critical angle, wherein background radiation passing through the aperture within the critical angle is separated from the laser beam image.

17. The method of claim 13, wherein the aperture is defined by a polished surface of a solid retro-reflector.

18. The method of claim 13, wherein the position of the centroid is defined relative to an origin position of the laser light sensor.

19. The method of claim 18, wherein a reference target orientation produces a laser beam image centered on the origin position.

* * * * *